2,769,789
Patented Nov. 6, 1956

2,769,789
RUBBER REINFORCING AGENTS AND COMPOSITIONS CONTAINING SUCH AGENTS

Evelyn William Madge, Sutton Coldfield, Wyndham Mobberley, Bournville, and Frederick Joseph Tibenham, Castle Bromwich, England, assignors to Dunlop Tire and Rubber Corporation, Buffalo, N. Y., a corporation of New York No Drawing. Application January 7, 1953,
Serial No. 330,164

Claims priority, application Great Britain
January 15, 1952

8 Claims. (Cl. 260—17.5)

This invention relates to rubber reinforcing agents and to compositions containing such agents.

It is known to prepare rubber compositions by incorporating lignin or lignin sulphonic acid in the rubber. These materials are products obtained from natural cellulosic materials, e. g. wood pulp; the lignin may be obtained by treatment with alkali and the lignin sulphonic acid by the so-called sulphite process. The lignin or lignin sulphonic acid may be used either as a reinforcing agent for rubber or in smaller quantities as a dispersing agent for dispersing other materials, e. g. carbon black, in the rubber. Both the lignin and the lignin sulphonic acid contain replaceable hydrogen atoms and form salts with metals, e. g. alkali metals and alkaline earth metals, and can thus be considered as being formed of an anionic lignin residue linked to hydrogen.

The present invention provides rubber compositions containing lignin derivatives which have improved physical properties.

According to the invention a novel rubber composition comprises rubber having incorporated therein a lignin compound having an anionic lignin residue linked to an organic cation having a long chain radical.

The reinforcing agents may be obtained by base exchange between a hydrophilic lignin compound and an organic compound having a cationic long chain radical. The reinforcing agents thus have an anionic lignin residue linked to an organic cation having a long chain radical. The hydrophilic lignin materials from which the reinforcing agents are made are hydrophilic because they contain inorganic cations, and as the reaction proceeds an increasing proportion of the inorganic cations is replaced by organic cations having long chain radicals. This replacement is accompanied by a decrease in hydrophilic tendencies and an increase in organophilic tendencies, and it is believed that the valuable properties of the novel compounds, by virtue of which they give rubber compositions with improved properties relative to rubber compositions containing the unchanged lignin compounds, is associated with these tendencies. The base exchange reaction may be allowed to proceed so far that substantially all the inorganic cations are replaced by the organic cations, or base exchange may proceed only part way, the product then still containing some inorganic cations.

The production of the reinforcing agent is effected by mixing aqueous solutions of a hydrophilic lignin compound and of the organic compound having the cationic long chain radical, the proportion of the two compounds in the solutions which are mixed being such that a suspension of the cation-exchanged lignin product results. In the preferred form of the invention the production of the reinforcing agent and its incorporation in rubber are carried out together by mixing a solution of a hydrophilic lignin compound with an alkaline aqueous dispersion of rubber, e. g. an alkaline natural rubber latex, adding the solution of the organic compound containing the cationic long chain compound, and then co-precipitating the cation-exchanged lignin product and the rubber, e. g. by addition of an acid. Alternatively the rubber dispersion may be added to the preformed suspension of the cation-exchanged lignin product and the latter then coprecipitated with the rubber by addition of an acid. It is also possible to separate the suspended cation-exchanged lignin product, wash it, and either disperse it in fresh aqueous medium and subsequently mix the dispersion with a rubber dispersion, or to disperse the washed product directly in a rubber dispersion, the rubber and the cation-exchanged lignin product being then co-precipitated by addition of an acid. The coagulum of rubber and cation-exchanged lignin product obtained by any of the procedures described above is washed and dried and subsequently mixed with vulcanizing and other compounding ingredients by milling, the compounded composition being then molded and vulcanized. Compounding materials may also be incorporated concurrently with the cation-exchanged lignin product by adding dispersions of the vulcanizing ingredients to the rubber dispersion before co-precipitation with the cation-exchanged lignin product, and co-precipitation of the rubber, cation-exchanged lignin product and compounding materials being then effected as by addition of acid, and the coagulum washed, dried and milled.

The cation-exchanged lignin product may also be prepared by mixing the two solutions of the hydrophilic lignin product and of the cationic long chain compound, isolating, washing and drying the cation-exchanged lignin product, and the latter compounded with the rubber by milling or by an internal mixer and vulcanizing and other compounding ingredients added at this stage or in a subsequent stage, the mixture being suitably worked up and then vulcanized.

Suitable hydrophilic lignin compounds which may be used in the production of the organophilic derivatives are lignin itself, lignin sulphonic acids, and water-soluble metal salts of these, e. g. the alkali metal salts and the alkaline earth metal salts. Preferably the lignin sulphonic acids or the salts thereof are employed, since they possess a greater capacity for base-exchange than does lignin. The lignin sulphonic acids vary in the proportion of sulphonic acid radicals which they contain, and it is preferred not to employ a very highly sulphonated lignin as the starting material, since if in effecting the base-exchange reaction all the inorganic cations are not replaced the compound may be sufficiently soluble in water to be washed out of rubber compositions in which it is incorporated. Suitable starting materials for the production of the hydrophilic lignin derivatives may be obtained from such highly sulphonated lignin derivatives by partial desulphonation. A particularly suitable starting material is that sold under the trade name "Marasperse CB," which is the sodium salt of a partially desulphonated lignin sulphonic acid.

The organic compound having the cationic long chain radical is preferably a quaternary ammonium compound having a long chain attached to the nitrogen atom. The long chain may be aliphatic and should contain at least 10 atoms in the chain. By the term "long chain" as used in this specification and claims is meant one of ten or more carbon chains under the various forms and linkages illustrated as follows. These may be all carbon atoms or the carbon chains may be interrupted by oxygen atoms forming ether linkages between shorter carbon chains. The long chain may comprise a benzene ring containing aliphatic substituents. As well as quaternary ammonium compounds, the corresponding derivatives of other tetravalent or pentavalent atoms may be employed, for example, the corresponding phosphonium, oxonium or stannonium compounds.

Particularly suitable are quaternary ammonium compounds of the type $R_1R_2R_3R_4N-X$, where X is halogen, $R_1$ is an alkyl radical containing from 10 to 20 carbon atoms or a radical having a terminal alkyl-substituted aryl group and containing at least two alkylene groups linked by ether linkages; $R_2$ is an aryl or aralkyl radical or an alkyl radical, and $R_3$ and $R_4$ are alkyl radicals. Examples of such compounds are cetyl trimethyl ammonium bromide, dodecyl trimethyl ammonium bromide, octadecyl trimethyl ammonium bromide, cetyl benzyl dimethyl ammonium chloride, lauryl benzyl dimethyl ammonium bromide, p-tert-octyl-phenoxy-ethoxy-ethyl dimethyl benzyl ammonium bromide, and p-tert-octyl-m-methyl-phenoxy-ethoxy-ethyl dimethyl benzyl ammonium chloride.

Also suitable are pyridinium halides having linked to the nitrogen atom an alkyl group containing 10 to 20 carbon atoms. Examples of such compounds are N-cetyl pyridinium chloride, N-dodecyl pyridinium chloride, N-octadecyl pyridinium chloride, and N-stearyl pyridinium chloride.

In addition to containing the novel lignin product of the invention the rubber compositions may contain other reinforcing materials, e. g. carbon black; they may also contain as a reinforcing material a polyvinyl compound, e. g. polyvinyl chloride, or a copolymer of vinyl chloride with a compound polymerizable therewith, e. g. vinyl acetate and/or vinylidene chloride.

The rubber may be natural rubber or a synthetic rubber, for example a polymer of a conjugated diene hydrocarbon or chlorohydrocarbon, or a copolymer of a conjugated diene hydrocarbon with a monomer copolymerizable therewith. Thus the synthetic rubber may be polychloroprene, polybutadiene, or a copolymer of butadine with isobutylene, styrene, methyl methacrylate or acrylonitrile. Oil-modified synthetic rubbers i. e. synthetic rubbers with which extender oils have been incorporated, may also be reinforced with the lignin products according to the invention.

The invention is illustrated by the following example:

*Example*

To 167 parts of concentrated rubber latex containing 100 parts of rubber, 35 parts of Marasperse CB dissolved in 100 parts of water, were added, the whole being well stirred. 17.5 parts (dry weight) of cetyl trimethyl ammonium bromide dissolved in 120 parts of water were then added to this mixture. Sufficient acetic acid was added to cause coagulation and the mixture then heated to about 70° C. while stirring. This resulted in the formation of a coarse crumb which could readily be filtered leaving a clear serum. The product was removed by filtration, washed free from water-soluble matter and dried. Vulcanizing ingredients consisting of 2 parts of stearic acid, 5 parts of zinc oxide, 3 parts of sulphur and 1 part of mercaptobenzthiazole were then incorporated on a mixing mill. Test pieces were then molded and vulcanized by heating for 60 minutes at 142° C.

For the purpose of comparison a blend of rubber and Marasperse CB was prepared in the same way but with the omission of the cetyl trimethyl ammonium bromide and from it similar test pieces were prepared. The following test results were obtained on the two compounds.

| Sample containing | Cation-exchanged lignin | Unmodified lignin |
|---|---|---|
| Modulus at (lbs./sq. in): | | |
| 100% | 220 | 75 |
| 300% | 690 | 155 |
| 500% | 1,280 | 420 |
| Tensile strength (lbs./sq. in.) | 2,460 | 2,465 |
| Elongation at break | 615 | 850 |
| Tear Strength (lbs./in.) | 390 | 165 |

The physical properties of rubber compositions containing the cation-exchanged lignin derivative can be further improved if there is incorporated with the rubber composition containing the cation-exchanged lignin derivative a methylene donor, for example, hexamethylene tetramine, the said methylene donor being reacted by heating with the lignin derivative before vulcanization of the rubber composition takes place. The methylene donor may be incorporated at any suitable stage of the compounding but it is preferred to do so during milling of the rubber composition.

Having described our invention, what we claim is:

1. A reinforced rubber composition comprising rubber and a compound incorporated therein said compound being a hydrophlic lignin compound having its base exchanged with the cationic component of an organic compound containing a cationic radical having a chain of at least ten carbon atoms to form a direct union of the lignin radical and the cationic radical.

2. A method of preparing a reinforced rubber composition which comprises exchanging the base of a hydrophilic lignin compound with the cationic component of an organic compound containing a cationic radical having a chain of at least ten carbon atoms to form a direct union of the lignin radical and the cationic radical and admixing the resulting compound with an alkaline aqueous dispersion of rubber and co-precipitating the rubber and resulting hydrophilic lignin compound.

3. A method of preparing a reinforced rubber composition which comprises exchanging the base of a hydrophilic lignin compound with the cationic component of an organic compound containing a cationic radical having a chain of at least ten carbon atoms to form a direct union of the lignin radical and the cationic radical and incorporating the resulting compound in rubber.

4. The method of claim 3 in which the rubber composition is dispersed in an aqueous medium.

5. The method of claim 2 wherein the co-precipitation is effected by addition of an acid.

6. The reinforced rubber of claim 1 in which said radical is a quaternary ammonium compound having a chain of at least ten carbon atoms attached to the nitrogen atom thereof.

7. The reinforced rubber of claim 1 in which the radical having a chain of at least ten carbon atoms is aliphatic.

8. The reinforced rubber of claim 1 in which said hydrophilic lignin compound is a lignin sulphonic radical.

References Cited in the file of this patent

UNITED STATES PATENTS

| | | |
|---|---|---|
| 2,130,668 | Gunther | Sept. 20, 1938 |
| 2,261,439 | Kelly | Nov. 4, 1941 |
| 2,321,111 | Stamberger | June 8, 1943 |
| 2,548,757 | Adams | Apr. 10, 1951 |
| 2,594,302 | Ehrensperger | Apr. 29, 1952 |
| 2,608,537 | Pollak | Aug. 26, 1952 |
| 2,664,377 | Van Beckum et al. | Dec. 29, 1953 |